United States Patent
Fukushima et al.

(10) Patent No.: US 6,417,123 B1
(45) Date of Patent: Jul. 9, 2002

(54) DIELECTRIC COMPOSITION USEFUL FOR LIGHT TRANSPARENT LAYER IN PDP

(75) Inventors: Norikazu Fukushima, Oumihachiman; Hiroyuki Oshita, Otsu; Takayuki Mito, Kanzaki-gun; Masahiko Ouji, Moriyama; Kazuo Hadano, Otsu, all of (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/638,712

(22) Filed: Aug. 14, 2000

(51) Int. Cl.$^7$ .................. C03C 3/066; C03C 3/074; C03C 8/14
(52) U.S. Cl. .................. 501/32; 501/76; 501/79
(58) Field of Search .................. 501/32, 76, 79

(56) References Cited

U.S. PATENT DOCUMENTS 3,595,785 A * 7/1971 Bruce et al.
4,451,761 A * 5/1984 Kay
4,451,869 A * 5/1984 Sakabe et al.
5,051,381 A * 9/1991 Ohji et al.

FOREIGN PATENT DOCUMENTS

| JP | 56-005348 A | * | 1/1981 |
| JP | 11-21148 | | 7/1997 |
| JP | 11-092168 A | * | 4/1999 |

OTHER PUBLICATIONS

Lewis, Sr, Hawley's Condensed Chemical Dictionary, p. 387, 1993.*

* cited by examiner

Primary Examiner—David Sample
(74) Attorney, Agent, or Firm—Collard & Roe, P.C.

(57) ABSTRACT

A dielectric composition for use in formation of a light transparent dielectric layer in a plasma display panel, which comprises glass powder of 90–100 weight % and ceramics powder of 0–10 weight %. The glass powder is powder of glass which consists essentially of, by weight percent, 15–45% BaO, 20–45% ZnO, 15–35% $B_2O_3$, 3–15% $SiO_2$, and 0–24.5% PbO.

4 Claims, No Drawings

DIELECTRIC COMPOSITION USEFUL FOR LIGHT TRANSPARENT LAYER IN PDP

BACKGROUND OF THE INVENTION

This invention relates to dielectric forming material useful in plasma display panels (PDPs) and, in particular, to dielectric composition used for forming light transparent dielectric layer on a front glass plate of a high strain point in PDPs.

Generally speaking, a PDP has a front glass plate on which a plurality of electrodes are disposed for generating plasma discharge by cooperation with electrodes deposited on a rear glass plate confronting the front glass plate with a gap therebetween. A light transparent dielectric layer is formed on the glass plate to cover the electrodes so as to maintain the plasma discharge generated.

Usually, the front glass plate is made of soda-lime glass or other high strain point glass, while the light transparent dielectric layer is formed from dielectric material comprising low fusion point glass powder, for example, high Pb-content glass powder. When forming the light transparent dielectric layer, the dielectric material is fired or baked at the softening point of the low fusion point glass powder so as to avoid the reaction with metal of the electrodes.

As known in the art, it is important that the dielectric material has various properties such as (1) thermal expansion coefficient compatible with glass plate, (2) firing temperature at 500–600° C., (3) excellent defoamability in firing to produce the dielectric layer of high light transmittance and high withstand voltage with a reduced amount of bubbles.

JP-A 11-21148 discloses dielectric material using a glass powder of $PbO$—$B_2O_3$—$SiO_2$—$BaO$ glass which has the thermal expansion coefficient compatible with that of the high strain point glass plate. The $PbO$—$B_2O_3$—$SiO_2$—$BaO$ glass is rapid in viscosity change across the softening point and is, therefore, readily defoamed.

Although the dielectric material using $PbO$—$B_2O_3$—$SiO_2$—$BaO$ glass powder can provide a dielectric layer having a high light transmittance because of its excellent defoamability, it has a problem that the produced dielectric layer has residual large bubbles having diameters of 30 $\mu$m (micrometers) or more.

SUMMARY OF THE INVENTION

It is an object of this invention to provide a dielectric material which is compatible with the high strain point glass plate in the thermal expansion coefficient, defoamable in firing at a temperature around the softening point, and able to provide a light transparent dielectric layer without large bubbles left therein.

In certain glass such as $PbO$—$B_2O_3$—$SiO_2$—$BaO$ glass described above which is so rapid in viscosity change across the softening point, the present joint inventors found out that bubbles are almost all expelled from the glass at a relatively low temperature during beginning of the firing process but some of them remain as residual bubbles in the glass, the residual bubbles then expanding into large bubbles as elevation of glass temperature in the continuous firing.

In order to improve the $PbO$—$B_2O_3$—$SiO_2$—$BaO$ glass described above, the joint inventors attempted, on one side, to reduce the content of PbO in the $PbO$—$B_2O_3$—$SiO_2$—$BaO$ glass to 24.5 wt. % or less so as to adjust the viscosity change across the softening point relatively slightly slow. On the other hand, it was attempted to increase the BaO content so as to compensate the thermal expansion coefficient lowered due to the reduction of the PbO content.

According to this invention, there is provided a dielectric composition for use in formation of a light transparent dielectric layer in a plasma display panel, comprising glass powder of 90–100 weight % and ceramics powder of 0–10 weight %, said glass powder being powder of glass which consists essentially of, by weight percent, 15–45% BaO, 20–45% ZnO, 15–35% $B_2O_3$, 3–15% $SiO_2$, and 0–24.5% PbO.

BaO is an element for adjusting viscosity at a high temperature to affect defoamability of the glass and for elevating the thermal expansion coefficient of the glass. The content of BaO is 15–45%, preferably 20.5–40%, by weight. BaO content less than 15% lowers the defoamability and also lowers the thermal expansion coefficient of the resultant glass to an excessively low level which is not compatible with that of the high strain point glass plate. If BaO content is more than 45%, the resultant glass has an excessively high thermal expansion coefficient which is not compatible with that of the high strain point glass.

ZnO is an element for lowering the softening point and adjusting the thermal expansion coefficient of the glass. The content of ZnO is selected at 20–45% by weight, preferably 22–42%. When the content is selected at less than 20%, the above-described function of ZnO is not achieved. When the content is selected at more than 45%, the thermal expansion coefficient is excessively lowered.

$B_2O_3$ is a glass forming element for widening a vitrification range of a composition and should be contained at 15–40% by weight, preferably 16–33%. Less than 15% of $B_2O_3$ results in probable devitrification of the glass during the firing. When the content is more than 40%, the glass becomes excessively high in softening point to make it difficult to fire at a temperature of 600°C. or less.

$SiO_2$ is also a glass forming element and should be selected, in content, at 3–15% by weight, preferably 4–13%. If $SiO_2$ is less than 3%, the resultant glass is readily devitrified during the firing. On the other hand, use of $SiO_2$ more than 15% excessively raises the resultant glass in the softening point to excessively slow the viscosity change across the softening point so that degassing becomes difficult.

PbO is an element for lowering the softening point of the glass and should be selected at contents of 0–24.5% by weight, preferably 0–24%. If the content of PbO is selected at more than 24.5%, the viscosity change of the resultant glass is excessively rapid across the softening point to promote growth of bubbles, this resulting to residual large bubbles remaining in the fired layer.

Contents of PbO, $B_2O_3$ and $SiO_2$ in weight should be determined by a ratio of $(PbO/(B_2O_3+SiO_2))<1$, preferably 0.9. When the ratio is selected at 1 or more, the resultant glass is excessively rapid in the viscosity change across the softening point to promote growth of bubbles. The residual bubbles in the fired layer have possibly a diameter of 30 $\mu$m or more.

Further, contents of PbO and BaO in weight should be determined by a ratio of $(PbO/BaO) \leq 1.5$, preferably 1.3, in order to enable the resultant glass to easily have the thermal expansion coefficient compatible with that of the high strain point glass plate.

It is possible for certain objects to add other ingredients in the glass, for example, CaO and MgO up to 10% in a total amount of them so as to raise the thermal expansion coefficient, and or CuO up to 2% so as to prevent the electrodes of Ag and the transparent dielectric layer from color-changing to yellow as well as to color the electrodes to blue.

According to another aspect of this invention, the glass powder preferably has an average particle size D50 of 3.0 micrometers (μm) or less, and the maximum particle size Dmax of 20 micrometers (μm) or less. If the average particle size and the maximum particle size exceeds the upper limits, there exist large gaps between adjacent glass particles, which promote generation of residual large bubbles in the fired dielectric layer.

The dielectric composition according to the present invention can include ceramics powder such as alumina, zircon, zirconia, and/or titania (titanium oxide) in addition to the glass powder, so as to improve the strength of the fired layer and adjust the appearance thereof. It is preferable that the maximum particle size Dmax of the ceramics powder is 15 μm or less.

In contents, the glass powder and the ceramics powder are 90–100% and 0–10% by weight, respectively. If the ceramic powder content is more than 10%, the resultant dielectric layer fired scatters the visible ray thereby to be opaque.

Examples of this invention will be described below.

Tables 1 and 2 demonstrate examples (sample Nos. 1–8) of this invention and comparative sample (sample No. 9).

TABLE 1

| | Invention | | | | |
|---|---|---|---|---|---|
| Sample No. | 1 | 2 | 3 | 4 | 5 |
| Glass powder (wt %) | | | | | |
| PbO | 10 | 10 | — | 4 | 20 |
| $B_2O_3$ | 22 | 30 | 22 | 18 | 24 |
| $SiO_2$ | 7 | 4 | 6 | 7 | 7 |
| ZnO | 33 | 28 | 37 | 40 | 26 |
| BaO | 28 | 28 | 35 | 31 | 23 |
| Ceramics powder | — | — | — | — | — |
| Added amount (wt %) | — | — | — | — | — |
| Transition Point (° C.) | 495 | 500 | 515 | 505 | 485 |
| Softening point (° C.) | 595 | 600 | 620 | 610 | 590 |
| Thermal expansion coefficient (× $10^{-7}$/° C.) | 77 | 77 | 82 | 76 | 75 |
| Firing temperature (° C.) | 580 | 590 | 600 | 595 | 570 |
| Fired layer thickness (μm) | 32 | 31 | 28 | 29 | 34 |
| Transmittance (%) | 80 | 81 | 82 | 80 | 79 |
| Number of large bubbles | 2 | 1 | 0 | 1 | 0 |

TABLE 2

| | Invention | | | Comparative |
|---|---|---|---|---|
| Sample No. | 6 | 7 | 8 | 9 |
| Glass Powder (wt %) | | | | |
| PbO | 23 | 15 | 15 | 33 |
| $B_2O_3$ | 25 | 25 | 25 | 22 |
| $SiO_2$ | 9 | 7 | 7 | 6 |
| ZnO | 26 | 33 | 33 | 21 |
| BaO | 21 | 30 | 30 | 18 |
| Ceramics Powder | — | — | alumina | — |
| Added amount (wt %) | — | — | 3 | — |

TABLE 2-continued

| | Invention | | | Comparative |
|---|---|---|---|---|
| Sample No. | 6 | 7 | 8 | 9 |
| Transition point (° C.) | 485 | 495 | 495 | 480 |
| Softening point (° C.) | 580 | 595 | 600 | 570 |
| Thermal expansion coefficient (× $10^{-7}$/° C.) | 74 | 75 | 75 | 75 |
| Firing temperature (° C.) | 560 | 580 | 585 | 555 |
| Fired layer thickness (μm) | 33 | 31 | 29 | 28 |
| Transmittance (%) | 79 | 80 | 79 | 80 |
| Number of large bubbles | 3 | 1 | 0 | 15 |

Each of samples were prepared by the following steps.

A charge of raw materials was blended for each of samples shown in Tables 1 and 2 and was melted in a platinum crucible at 1,300° C. for two hours. Then, the molten glass was formed in a thin plate shape, which was in turn crushed and classified to obtain a glass powder having an average particle size D50 of 3.0 μm or less and maximum particle size Dmax of 20 μm or less. The transition point and softening point of the glass powder were measured and recorded. The glass powder of No. 8 sample was mixed with aluminum powder to obtain a mixed powder thereof.

The average particle size D50 and maximum particle size Dmax were confirmed by use of a particle size distribution meter of a laser diffractive type "Microtrack SPA" manufactured by Nikkiso Ltd.

With respect to each sample, measuring was done of the thermal expansion coefficient, the firing temperature, the thickness of the fired layer, and the spectral transmittance at a wavelength of 550 nm. It was also carried out to count the number of bubbles having a diameter of 30 μm or more present in the fired layer. The measured data are shown in Tables 1 and 2.

It is seen from Tables 1 and 2 that samples of Nos. 1–8 of the example of this invention have the glass transition point of 485–915° C. and the softening point of 580–620° C., a temperature difference between the transition point and the softening point being 95–105° C., the thermal expansion coefficient of $74–82\times10^{-7}$/° C., and the firing temperature of 570–600° C. The fired layer has a thickness of 28–34 μm, the transmittance of 79% or more at the wavelength of 550 nm, and only three or less large bubbles therein. In comparison with these samples, the comparative sample No.9 has the glass transition point of 480° C. and the softening point of 570° C., a temperature difference between the transition point and the softening point being small as 90° C. Therefore, the viscosity change is too rapid at a firing temperature range to promote the growth of bubbles. Therefore, the fired layer has so many large bubbles as 15 bubbles.

In measuring the glass transition point and the softening point, a differential thermal analyzer of a macro type was used and values of the first and fourth inflection points were selected as the glass transition point and the softening point, respectively.

The thermal expansion coefficient was measured according to JIS R 3102 at a temperature range of 30–300° C. of a sample piece which was formed by the following steps. Each of the sample powders were press-formed, fired, and ground to form the sample piece of a cylindrical rod having a diameter of 4 mm and a length of 40 mm.

The thickness, the transmittance and number of large bubbles of the fired layer were obtained in the following manner. The each sample powder was mixed in a 5% terpineol solution of ethyl cellulose and kneaded by use of a three-roll mill to form a paste which was, in turn, applied by the screen printing process to obtain a fired layer of 30 μm thickness onto a high-strain point glass plate (having a thermal expansion coefficient of $83 \times 10^{-7}/°$ C. and fired in an electric furnace for 10 minutes at the firing temperature. The thickness of the fired layer was confirmed by use of a digital micrometer.

The transmittance was measured for the wavelength of 550 nm by use of an integration sphere of a spectrophotometer by setting the high-strain point glass plate having the fired layer at a sample setting side of the spectrophotometer.

Using a stereoscope (30 magnitude), it was carried out to count number of large bubbles having a diameter of 30 μm or more as seen within an area of 3 cm×4 cm in the surface of the fired layer.

As described above, the dielectric composition of this invention is useful for forming a light transparent dielectric layer onto a front glass plate having a high-strain point and covering electrodes formed on the front glass plate.

What is claimed is:

1. A dielectric composition for use in formation of a light transparent dielectric layer in a plasma display panel, comprising glass powder of 90–100 weight % and ceramics powder of 0–10 weight %, said glass powder being powder of glass which consists essentially of, by weight percent, 20.5–40% BaO, 20–45% ZnO, 15–35% $B_2O_3$, 3–15% $SiO_2$, and 0–24.5% PbO.

2. A dielectric composition as claimed in claim 1, wherein contents of PbO, $B_2O_3$ and $SiO_2$ in weight are determined by a ratio of $(PbO/(B_2O_3+SiO_2))<1$.

3. A dielectric composition as claimed in claim 1, wherein contents of PbO and BaO in weight are determined by a ratio of $(PbO/BaO) \leq 1.5$.

4. A dielectric composition as claimed in claim 1, wherein said glass powder has an average particle size D50 of 3.0 micrometers (μm) or less, and the maximum particle size Dmax of 20 micrometers (μm) or less.

* * * * *